United States Patent
Jiang et al.

(10) Patent No.: US 8,271,986 B2
(45) Date of Patent: *Sep. 18, 2012

(54) VISUAL AND GRAPHICAL DATA PROCESSING USING A MULTI-THREADED ARCHITECTURE

(75) Inventors: Hong Jiang, San Jose, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 2990 days.

This patent is subject to a terminal disclaimer.

(21) Appl. No.: 10/750,589

(22) Filed: Dec. 31, 2003

(65) Prior Publication Data

US 2005/0198644 A1    Sep. 8, 2005

(51) Int. Cl.
  *G06F 9/46*    (2006.01)
(52) U.S. Cl. .................................................. 718/104
(58) Field of Classification Search ........ 718/1; 710/200; 712/28
See application file for complete search history.

(56) References Cited

U.S. PATENT DOCUMENTS

| | | | |
|---|---|---|---|
| 5,715,459 A | 2/1998 | Celi, Jr. et al. | |
| 5,951,672 A | 9/1999 | Kwok et al. | |
| 6,018,785 A * | 1/2000 | Wenniger | 710/200 |
| 6,088,044 A | 7/2000 | Kwok et al. | |
| 6,502,097 B1 | 12/2002 | Chan et al. | |
| 2003/0038798 A1 | 2/2003 | Besl et al. | |

FOREIGN PATENT DOCUMENTS

JP    2000-010943    1/2000

OTHER PUBLICATIONS

Takumaru, Hiroshi, "Sureddo Koryaku Kokoroecho (Hints to Master Threads)", JAVA Developer, Softbank Publishing Corp., Sep. 1, 2002, No. 2, pp. 58-68 (Domestic Technical Magazine 2005-00146-006).

Japanese Patent Office, Office Action (with translated Summary) issued in corresponding Japanese Application No. 2006-547368, 7 pgs., Jun. 2, 2009.

* cited by examiner

*Primary Examiner* — Meng An
*Assistant Examiner* — Eric C Wai
(74) *Attorney, Agent, or Firm* — Trop, Pruner & Hu, P.C.

(57) ABSTRACT

Active and/or proactive semaphore mechanisms and thread synchronization techniques can be applied to various visual and graphical processing techniques.

19 Claims, 6 Drawing Sheets

VISUAL AND GRAPHICAL DATA PROCESSING USING A MULTI-THREADED ARCHITECTURE

TECHNICAL FIELD

The invention relates to visual and graphical data processing. More particularly, the invention relates to use of active semaphore mechanisms to perform visual and graphical data processing operations.

BACKGROUND

A "semaphore" (also referred to as "critical sections" or "mutex") is a hardware and software construct that allows coordination or synchronization of operations in which multiple processes compete for shared resources (e.g., memory, files). In general, a semaphore is a value that is stored in a designated location in operating system memory that processes can check and change. Based on the value of the semaphore, a process can either access the shared resource or wait for a period of time and check the semaphore again.

Semaphores in conventional computer systems are typically implemented as software routines using hardware support of atomic "test and set" or similar types of instructions (e.g., lock, bit test, bit test and set, bit test and reset). Using this semaphore implementation, a producer-consumer communication relationship can be established through shared (e.g., global) data and one or more semaphores. The semaphore allows shared data to be modified by a selected one of multiple processes that are attempting to modify the data, which provides data consistency.

This semaphore construct is "passive" because threads must perform polling operations to acquire a semaphore. The polling requirement consumes processor and system resources that could otherwise be used for other purposes. Therefore, traditional semaphores can result in inefficiencies.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for visual and/or graphical data processing using active semaphores are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Overview of an Example Use of Active Semaphores

Described herein is an architecture and associated methods in which multiple parallel passive threads of instructions (hereinafter referred to as "threads") coordinate access to shared resources using "active" semaphores. The semaphores are referred to as active because the semaphore entity sends messages to execution and/or control circuitry to cause the state of a thread to change. For example, a thread can be placed in a sleep (or inactive) mode by a thread scheduler in response to an unresolved dependency, which can be indicated by a semaphore. A thread state variable corresponding to the dependency is used to indicate that the thread is in sleep mode.

When the dependency is resolved a message is passed to control circuitry (e.g., the thread scheduler) causing the dependency variable to be cleared. In response to the cleared dependency variable the thread is placed in an active (or wake) state. Execution can proceed on the threads in the active state.

Continuing with the example above, if a thread attempts to acquire a semaphore and cannot, that thread is placed in an inactive state. Because the thread is inactive, it cannot poll the semaphore to determine when the dependency indicated by the semaphore is resolved, as is required in the prior art. The thread remains in the inactive state until a message is received (e.g., from the semaphore entity) indicating that the dependency has been resolved. In response to the message, the thread is placed in the active state, which allows execution to proceed.

Figure 1:
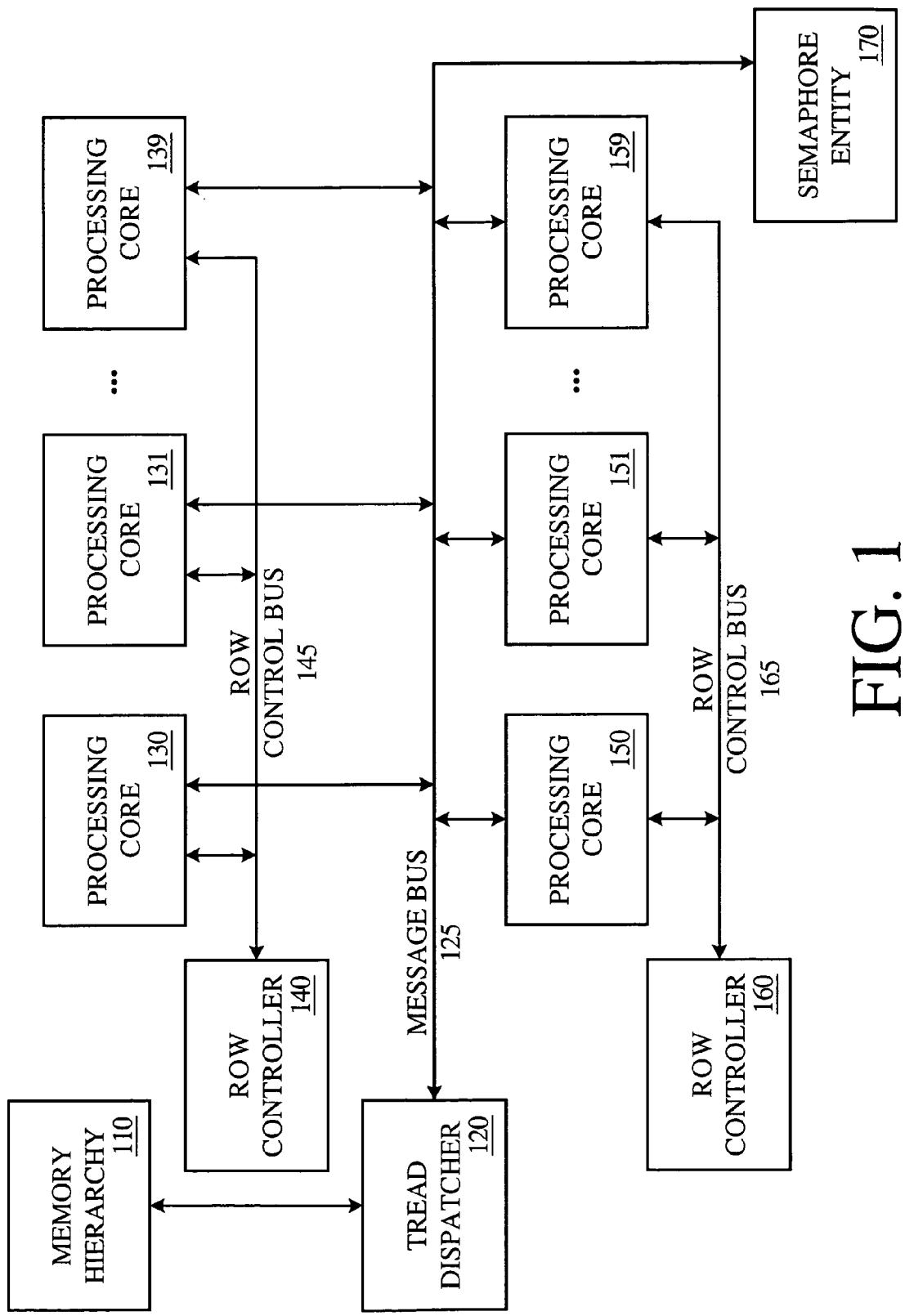
FIG. 1 is a block diagram of one embodiment of a massively multi-threaded processor architecture.

FIG. 1 is a block diagram of one embodiment of a massively multi-threaded processor architecture. As used herein, the label "massively multi-threaded" architecture refers to an architecture that includes multiple processors that can support multi-threaded execution. In one embodiment, each processor may support one or multiple threads. Multi-threading on a single processor achieves high execution efficiency by allowing active threads to be executed while other threads are in inactive state. A thread in the inactive state pending on a semaphore does not consume/waste processor resources. Notwithstanding the description with respect to a massively multi-threaded architecture, the semaphore constructs and associated methods are applicable to any multi-threaded architecture regardless of the number of threads supported.

Massively multi-threaded system 100 includes memory hierarchy 110 that stores data and instruction to be used during execution by one or more processing cores. Memory hierarchy 110 may include dynamic random access memory (DRAM), one or many levels of instruction caches, one or many levels of data caches, and/or one or many levels of shared instruction and data caches in any manner known in the art. Thread dispatcher 120 is coupled with memory hierarchy 110, receives information such as instruction pointer and data and/or data pointer associated with a new thread. Thread dispatcher 120 also coupled with the processing cores via message bus 125. In one embodiment, thread dispatcher 120 is responsible of managing the thread resources of the processing cores. Upon receiving a new pending thread, thread dispatcher 120 selects one processing core that has the resource to execute the pending thread and dispatches the thread onto the selected processing core. Upon the completion of an existing thread on a processing core, thread dispatcher 120 is informed, consequently, making the thread resource on the processing core available for future pending threads.

System 100 is illustrated with multiple processor cores (130, 131, 139, 150, 151 and 159), each of which include execution circuits with associated control circuitry. The processor cores can be identical or the processor cores can have varying functionality. Any number of processor cores can be included in system 100. In one embodiment, the processor cores are configured in rows, each row having a row controller. For example, row controller 140 can be coupled with processor cores 130, 131 and 139 via row control bus 145. Similarly, row controller 160 can be coupled with processor cores 150, 151 and 159 via row control bus 165.

The processor cores are also coupled with semaphore entity 170 via message bus 125. Semaphore entity 170 includes memory and control logic to provide semaphore functionality as described herein. In one embodiment, semaphore entity 170 interacts with the processor cores by transmitting and receiving messages as described in greater detail below.

Thread dispatcher 120 is also coupled with semaphore entity 170 via message bus 125. In one embodiment, thread dispatcher interacts with semaphore entity 170 on behalf of a thread by transmitting and receiving messages as described in greater detail below.

Control circuitry in each processing core may contain thread scheduling circuitry to manage the state of multiple threads executing on the same processing core and may also contain instruction scheduling circuitry to execute an active thread of instructions. During instruction execution, one or more of the processing cores will attempt to access shared system resources. In order to gain control of a shared system resource a thread, through the corresponding execution core, must gain control of a semaphore corresponding to the shared system resource to be accessed.

In one embodiment, in order to gain control of a semaphore, the requesting processing core sends a semaphore request message to semaphore entity 170 over message bus 125. After sending the semaphore request message, the requesting thread is placed in an inactive state in which execution and associated operations (e.g., polling of semaphores) halts.

In response to receiving the semaphore request message, semaphore entity 170 determines whether to grant control of the semaphore to the requesting thread. When the semaphore is granted, semaphore entity 170 sends a semaphore acknowledge message to the requesting thread. In response to the semaphore acknowledge message, the requesting thread is restored to an active state in which execution using the requested resource continues. When the thread has completed use of the shared resource, the thread sends a release semaphore message to semaphore entity 170. In response to the release semaphore message, semaphore entity 170 releases the semaphore and allows other threads to gain access to the system resource.

In one embodiment, semaphores are supported by instructions (semaphore instructions) that are executed by a processing core as well as messages (semaphore messages) that are passed between processing cores and semaphore entity over, for example, a message bus 125. In alternate embodiments, different and/or additional messages or instructions can be supported.

Semaphore Entity Based on a Linked List

In one embodiment, traditional per semaphore queues are replaced by a buffer pool having entries that are used to form a linked list for each semaphore. Thus, each semaphore can be a head pointer to a linked list formed from entries in the buffer pool. The linked list can be either a bi-directional linked list or a uni-directional linked list.

In one embodiment, a semaphore table includes a pointer for each semaphore supported. In one embodiment, the pointers in the semaphore table are head pointers that indicate a head of a linked list to be used for the corresponding semaphore. A free pool pointer indicates the head of buffer pool and unused semaphore entries include a NULL pointer.

In one embodiment, each semaphore entry includes a released-state field, an ack-suppression field, a thread identifier field, a previous pointer and a next pointer. In alternate embodiments, other and/or different fields can be used, for example, the previous pointer can be omitted. In one embodiment, each semaphore can also include a single bit (or other indicator) to indicate whether the linked list corresponding to the semaphore is empty.

Semaphore Messages

An Acquire Semaphore Message (ACQ_MSG) is used for a thread, or a thread dispatcher on behalf of a thread, to make a request to the semaphore entity for ownership of a semaphore. In one embodiment, the ACQ_MSG contains a semaphore identifier field, a thread identifier field, an "auto-release" field and an "acknowledge-suppression" (ack-suppression) field. The auto-release field is used for a thread with only a head dependency. That is, the thread depends on previous threads, but no subsequent threads depend on the thread. The ack-suppression field is used for a thread with only a tail dependency. That is, the thread does not depend on any previous threads, but the thread does have subsequent threads depending on it. The ACQ_MSG can be issued by a thread dispatcher or other control circuitry associated with the thread.

In one embodiment, upon receiving the ACQ_MSG the semaphore entity enqueues the semaphore entry for the request thread to a linked list of the target semaphore by removing the head entry from a free pool list and adding it to the tail of the selected semaphore. The fields of the semaphore entry are updated based on the information in the ACQ_MSG: the thread identifier field, the release-state field and the ack-suppression field are replaced by the requester's thread identifier, the auto-release field and the ack-suppression field in the ACQ_MSG. If the semaphore linked list is not empty before the ACQ_MSG no message is sent by the semaphore entity. Otherwise, if the semaphore linked list is empty before the ACQ_MSG is received one of the following actions is taken.

If the ack-suppression field is not set an ACK_MSG with the thread identifier is sent from the semaphore entity on the message bus 125 to the requesting thread. If the ack-suppression field is set no ACK_MSG is sent from the semaphore entity. If the auto-release field is not set, the just-enqueued semaphore entry is maintained in the semaphore linked list. If the auto-release field is set the just-enqueued semaphore entry is removed from the semaphore linked list.

A Release Semaphore Message (REL_MSG) is used for a thread to make a request to the semaphore entity to free ownership of a semaphore. In one embodiment, the REL_MSG includes a semaphore identifier field and a thread identifier field. In one embodiment, the REL_MSG can only be issued by control circuitry associated with a thread holding ownership of the semaphore, i.e., the thread identifier is at the top of the semaphore linked list. Upon receiving the REL_MSG the semaphore entity removes the entry from the head of the semaphore linked list.

In another embodiment, the REL_MSG can be issued by control circuitry associated with any thread sharing the semaphore. Upon receiving the REL_MSG the semaphore entity unsets the release-state field to the corresponding entry in the semaphore linked list regardless of the position of the entry in the linked list. If semaphore entry is at the head of the linked list, the entry is removed from the head of the semaphore linked list. The next entry is then becoming the head of the linked list. If the next entry is not NULL, it will be examined. If the new head of the linked list has the release-state field set, it is again removed from the head of the semaphore linked list.

In one embodiment, this recursive process continues until either the head of the linked list is NULL (the semaphore queue is empty) or the head of the linked list has the released-state field unset (waiting for the release of the semaphore from the thread corresponding to the entry). If the head of the linked list is not NULL and the ack-suppression field is not set, an ACK_MSG is sent by the semaphore entity to the thread identified by the entry's thread identifier field. If the head of the linked list is not NULL and the ack-suppression field is set, no ACK_MSG is sent.

The Semaphore Acknowledgement Message (ACK_MSG) is generated by the semaphore entity to notify a thread that the requested semaphore has been acquired. In one embodiment, the ACK_MSG includes a semaphore identifier field and a thread identifier field. The ACK_MSG is issued only by the semaphore entity and received by the processing core executing the thread identified by in the thread identifier field.

Upon receiving the ACK_MSG the receiving processing core unsets the wait-semaphore state variable of the thread identified by the thread identifier field. If the thread is in an inactive state, the thread state is changed to an active state.

Semaphore Instructions

An Acquire Semaphore (ACS) instruction causes an ACQ_MSG message to be sent to the semaphore entity with a semaphore identifier of the requested semaphore, the thread identifier of the requesting thread and with the auto-release field unset. The thread is put in an inactive state with the wait-semaphore state field set. The ACS instruction is paired with (followed by) a Release Semaphore (RLS) instruction (described below). The ACS-RLS instruction pair can be used for critical section applications.

An Acquire Semaphore with Auto-Release (ASR) instruction causes an ACQ_MSG to be sent to the semaphore entity with a semaphore identifier for the requested semaphore, a thread identifier of the requesting thread and with the auto-release field set. The thread is put in an inactive state with the wait-semaphore state field set. In one embodiment, the ASR instruction cannot be paired with the RLS instruction. In one embodiment, the ASR instruction is used for threads with only a head dependency.

A Wait Semaphore (WTS) instruction causes the wait-semaphore thread state to be checked. If the state is set the thread is put in the inactive state. If the state is not set the thread remains in the active state. No message is sent to the semaphore entity in response to a WTS instruction. Use of the WTS instruction implies that the semaphore was acquired previously by the thread dispatcher using the ACQ_MSG on behalf of the thread at the thread dispatch time. The WTS instruction is not used if the ack-suppression field is set in the ACQ_MSG previously issued by the thread dispatcher.

A Release Semaphore (RLS) instruction causes a REL_MSG to be sent to the semaphore entity with a semaphore identifier for the semaphore being released and a thread identifier for the releasing thread. The releasing thread remains in the active state. If an ACS instruction has been previously issued for the releasing thread only one RLS instruction is issued. If an ASR instruction has been previously issued for the releasing thread no RLS instruction is issued. If a WTS instruction has been issued for the releasing thread, the WTS instruction may or may not be followed by a RLS instruction depending on the auto-release field of the ACQ_MSG sent by the thread dispatcher. If the auto-release field is unset, no RLS instruction is issued. If the auto-release field is set a RLS instruction follows the WTS instruction.

Example Acquisition of an Active Semaphore

As a thread of instructions is executed by a processor, the instructions are executed when resources are available. When a resource having a semaphore is required, for example, a shared memory location, ownership of a semaphore may be required to access the resource. Thus, execution of the thread of instructions is accomplished in any manner known in the art until a semaphore is needed.

In one embodiment, when a semaphore is needed, an Acquire Semaphore (ACS) instruction is executed. The ACS instruction can be executed by the processor executing the thread of instructions requesting the semaphore. As part of, or in response to, execution of the ACS instruction, an Acquire Semaphore Message (ACQ_MSG) is transmitted to the semaphore entity by the processing core executing the thread over the message bus. One format for the ACQ_MSG is described above. Other formats can also be used.

As part of, or in response to, execution of the ACS instruction, the thread requesting the semaphore is placed in an inactive state with the wait-semaphore state field set. By placing the thread in the inactive state, instructions in the thread are not executed, which includes polling of the requested semaphore should the initial semaphore request be refused. By placing the thread in the inactive state processor resources and system bandwidth are not consumed by the thread polling the semaphore. For a processing core supporting multi-threading, the processor resources and system bandwidth can be used by other active threads.

The semaphore entity receives the ACQ_MSG and places the requester information entry in the linked list of the target semaphore. If the semaphore is not owned or controlled by another thread, the semaphore entry is placed at the head of the semaphore linked list because there are no other entries. If the semaphore is owned or controlled by another thread, the semaphore entry is placed at the tail of the semaphore linked list. In one embodiment, the tail of the linked list is identified by traversing the linked list entries in the buffer pool from a head entry to a tail entry and the new entry becomes the new tail entry. In another embodiment, the tail of the linked list is directly identified by the tail pointer of the linked list stored in the semaphore table.

As threads complete use of the resource corresponding to the semaphore the thread holding the semaphore releases control of the semaphore, which is described in greater detail below. When a semaphore is released the corresponding semaphore entry at the head of the semaphore linked list is removed and the subsequent semaphore entry in the linked list becomes the head of the linked list.

When a semaphore entry becomes the head of the semaphore linked list, its state fields are examined by the semaphore entity. If the ack-suppression field is not set, an acknowledgement message (ACK_MSG) is transmitted from the semaphore entity to the thread associated with the semaphore entry. One format for the ACK_MSG is described above. Other formats can also be used. The ACK_MSG indicates to the receiving entity that the receiving entity has been granted control of the corresponding semaphore.

In response to the ACK_MSG the corresponding thread is activated. When activated, processing of instructions in the thread resumes and the shared resource corresponding to the semaphore can be accessed. When the thread has completed access to the shared resource the semaphore is released, which is described in greater detail below.

Example Release of an Active Semaphore

In one embodiment, a semaphore is released when a Release Semaphore (RLS) instruction is executed. The RLS instruction can be executed by the processor executing the thread of instructions requesting the semaphore. As part of, or in response to, execution of the RLS instruction, a Release Semaphore Message (REL_MSG) is transmitted to the semaphore entity. One format for the REL_MSG is described above. Other formats can also be used.

In response to the REL_MSG, the semaphore entity matches the thread identifier field of the REL_MSG with the semaphore linked list. If the corresponding semaphore entry is at the head of the linked list, the semaphore entity removes the thread entry from head of the linked list. The subsequent entry in the linked list becomes the head entry. The semaphore can then be granted to the thread corresponding to the new head entry. If the corresponding semaphore entry is not at the head of the linked list, the semaphore entity set the release-state field of the semaphore entry.

Behavior Models

Based on the formation of the linked list used, semaphores can be classified as associative semaphores or ordered semaphores. Based on the transmission of the ACK_MSG from the semaphore entity, semaphores can be classified as active semaphores or as proactive semaphores. Thus, four types of semaphores can be supported.

Overview of One Embodiment of Associative Semaphores

An associative semaphore allows concurrent threads to access the semaphore in any order. In one embodiment, a semaphore is initialized by the thread dispatcher at the beginning of a session with a NULL linked list (or a single bit to indicate an empty linked list). No other message is sent from the thread dispatcher to the semaphore entity. The semaphore linked list is built on the fly by the execution circuitry executing the multiple threads of instructions.

In one embodiment, a thread makes a request for an associative semaphore by executing an ACS or an ASR instruction. The thread releases an associative semaphore by executing a RLS instruction. In one embodiment, a new ACQ_MSG will result in an entry corresponding to the requesting thread being placed at the tail of the semaphore linked list. This provides a first-come, first-served (FCFS) semaphore model.

Overview of One Embodiment of Ordered Semaphores

An ordered semaphore allows concurrent threads to access the semaphore in a predetermined order. The order is predetermined by the thread dispatcher at the time of dispatching. The order can be application dependent. As thread dispatching is sequential in nature, the thread dispatcher may send an ACQ_MSG on behalf of each dispatched thread to the semaphore entity to build the semaphore linked list according to that order.

A thread entering a critical section may use the WTS instruction to wait for ownership of the semaphore. The ACS and ASR instructions are not used as the thread will have already been placed in the semaphore linked list. In one embodiment, the semaphore entity can only provide control of the semaphore according to the linked list order. Threads waiting on the semaphore will receive the ACQ_MSG in the linked list order.

Overview of One Embodiment of Active Semaphores

As described above, with an active semaphore the ACQ_MSG is used to cause a transition of a thread from an inactive state to an active state. The semaphore entity receives one or many ACQ_MSGs from execution circuitry executing threads. The semaphore entity only transmits one ACK_MSG to the execution circuitry corresponding to the thread at the head of the semaphore linked list. Upon removing the head of the semaphore linked list, the semaphore entity examines the state of the new head of the linked list, and may transmit subsequent ACK_MSG to the execution circuitry corresponding to the thread of the new head of semaphore linked list. An active semaphore can also be an associative semaphore.

Overview of One Embodiment of Proactive Semaphores

A proactive semaphore transmits one and only one ACK_MSG to the thread at the head of the semaphore linked list whether or not the thread is in the inactive state. This applies to threads using ordered semaphores with ACQ_MSG sent previously by the thread dispatcher so that only one ACK_MSG sent to a thread. A thread using an ordered semaphore may contain a WTS and/or a RLS instruction.

For a proactive semaphore, the ACK_MSG is sent automatically by the semaphore entity to the thread at the head of the semaphore linked list. In one embodiment, there exists a possibility of a "risk condition" that may exist if the timing of an entry from a thread is enqueued in the semaphore linked list by the thread dispatcher and the time the thread is visible to the execution circuitry. Because both actions are initiated by the thread dispatcher, but occur through different data paths, the timing of these events must be considered.

If thread execution begins before semaphore configuration, there will be no risk condition if there is a WTS instruction in the thread. Because the wait-semaphore thread state variable is set by the thread dispatcher, even if the WTS instruction of the thread is reached before the thread is enqueued to the semaphore linked list the risk condition will not occur. The WTS instruction causes the thread to enter the inactive state without sending a message to the semaphore entity. When the semaphore entity sends an ACK_MSG to the thread, the execution circuitry causes the thread to be active again.

If the semaphore is configured by the thread dispatcher with the ack-suppression field set a risk condition may result. In this case, the thread will not be placed in the inactive state. Instead, if the thread reaches the RLS instruction and sends a REL_MSG to the semaphore entity before the semaphore is configured for the thread, the semaphore entity may not be in condition to process the REL_MSG. In order to avoid this risk condition, the thread execution and the semaphore entity can ensure that the REL_MSG does not pass the ACQ_MSG issued by the thread dispatcher.

Thus, in one embodiment, in order to avoid the risk condition, the thread dispatcher completes thread configuration before completion of semaphore configuration if the ack-suppression is not set. The thread dispatcher completes semaphore configuration before completion of thread configuration if the ack-suppression field is set. Because the thread dispatcher dispatches ready thread serially, sequential operations can ensure the necessary orderings.

When thread configuration is completed before semaphore configuration, the thread dispatcher can dispatch a thread and wait for a signal that indicates that thread configuration is complete before sending a message to cause configuration of the semaphore. When semaphore configuration is completed before thread configuration, the thread dispatcher can send a message to initiate configuration of the semaphore and wait for a signal that indicates that the semaphore configuration is complete before dispatching the thread. Because serial configurations can unnecessarily limit the throughput from the dispatcher, the configuration operations can be pipelined.

Thread Synchronization

Figure 2A:
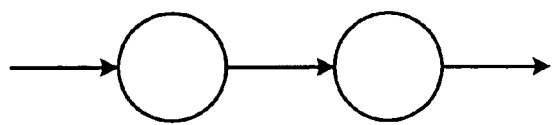
FIGS. 2a-2d are conceptual illustrations of dependencies in which semaphores can be used to synchronize thread execution.

FIGS. 2a-2d are conceptual illustrations of dependencies in which semaphores can be used to synchronize thread execution. FIG. 2a illustrates a 1:1:1 (one on one) dependency. The dependency of FIG. 2a can be a strong sequential order dependency or an associative dependency. For a strong sequential order dependency, a single proactive, ordered semaphore can be used. In one embodiment, the ACQ_MSG sent from the thread dispatcher to the semaphore entity to request the semaphore, the ack-suppression field and the auto-release field are both unset. The thread of instructions includes a WTS-RLS instruction pair to obtain and release the semaphore.

For an associative dependency, a single active, associative semaphore can be used. In one embodiment, in the ACQ_MSG sent from execution circuitry executing a thread to the semaphore entity to request the semaphore, the ack-suppression field and the auto-release field are both unset. The thread of instructions includes an ACS-RLS instruction pair to obtain and release the semaphore.

Figure 2B:
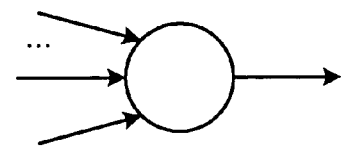

FIG. 2b illustrates a 1:N (one on many) dependency, where one thread has head dependency on N other threads where the N other threads do not depend on each other. Here N is a positive integer number that can be one or greater than one. For a 1:N dependency, a single proactive, ordered semaphore can be used. In one embodiment, for the N independent threads, ACQ_MSGs are sent by the thread dispatcher on behave of the N threads. In the ACQ_MSG sent from the thread dispatcher to the semaphore entity to request the semaphore, the ack-suppression field is set and the auto-release field is unset. For the single thread, which has head dependency on the other N threads, an ACQ_MSG is also sent by the thread dispatcher. In the ACQ_MSG to request the semaphore, the ack-suppression field is unset and the auto-release field is set. The N threads of instructions include only an RLS instruction to release the semaphore. The single thread of instructions includes a WTS-RLS instruction pair to obtain and release the semaphore.

Figure 2C:
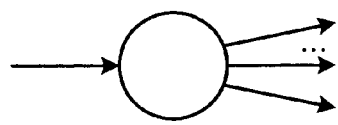

FIG. 2c illustrates a N:1 (many on one) dependency, where N threads have head dependency on a single thread but the N threads do not depend on each other. For a N:1 dependency, a single proactive, ordered semaphore can be used. In one embodiment, the thread dispatcher is responsible of sending ACQ_MSG on behave of both the N depending threads and the one dependent thread. In one embodiment, for the single dependent thread, in the ACQ_MSG to request the semaphore, the ack-suppression field is set and the auto-release field is unset. For the N depending threads, in the ACQ_MSG to request the semaphore, the ack-suppression field is unset and the auto-release field is set. The single dependent thread of instructions includes only an RLS instruction to release the semaphore. The N depending threads of instructions include a WTS-RLS instruction pair to obtain and release the semaphore.

Figure 2D:
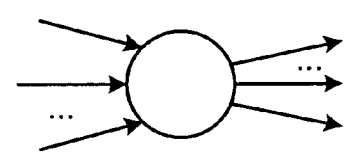

FIG. 2d illustrates a N:M (many on many) dependency, where N depending threads have head dependency on M dependent threads. In this case, the N depending threads do not depend on each other, and the M dependent thread do not depend on each other. The N:M dependency case is a more general case comparing to the 1:1:1, 1:N and N:1 cases described above. For a N:M dependency, a single proactive, ordered semaphore can be used. In one embodiment, the thread dispatcher is responsible of sending ACQ_MSGs on behave of both the N depending threads and the M dependent threads. In one embodiment, for the M dependent threads, in the ACQ_MSG to request the semaphore, the ack-suppression field is set and the auto-release field is unset. For the N depending threads, in the ACQ_MSG to request the semaphore, the ack-suppression field is unset and the auto-release field is set. The M dependent threads of instructions include only an RLS instruction to release the semaphore. The N depending threads of instructions include a WTS-RLS instruction pair to obtain and release the semaphore.

The dependencies of FIGS. 2a-2d can be used to support more complex dependencies. For example, for a N:1:N dependency, two proactive, ordered semaphores are used. The N:1 dependency is processed as described above with respect to FIG. 2c and the 1:N dependency is processed as described above with respect to FIG. 2b.

As described in greater detail below, the semaphore mechanisms and the thread synchronization techniques described above can be applied to many operations performed in a computer or similar electronic system. In the examples set forth below, various graphical processing techniques can be performed using the semaphore constructs described herein. While the graphical processing techniques provide useful examples for use of active and proactive semaphores, use of these semaphore mechanisms is not limited to graphical data processing.

Semaphores and Ray Tracing

Ray tracing is a technique for rendering three-dimensional graphics and can support complex light interactions such as mirrors, transparent surfaces, shadows, etc. In general, ray tracing is based on modeling reflection and refraction by recursively following (tracing) a path that a ray of light takes at the ray bounces through a scene. A trace of a ray between two bounces (or between the screen position to the first bounce or between a screen position or a bounce to the light source) is referred to as a ray segment. As the ray is traced from the viewing perspective (e.g., a camera) to the light source, the color is determined for each pixel. Various techniques for ray tracing are known in the art. See, for example, Cook, R. L. and Torrance, K. E., "A Reflectance Model for Computer Graphics," ACM Trans. on Graphics 1, 1 (January 1982) and Glassner, A. (ed), "An Introduction to Ray Tracing," Academic Press, New York, 1989.

When rendering an image using ray tracing techniques, an image screen can be rendered by with starting the eye rays on each screen position. A screen position is also referred to as destination pixel. Each eye ray will traverse the three-dimensional scene space and generate one or many ray segments due to the reflection and refraction interaction with the objects in the scene. Ray segments associated with different destination pixels are independent of each other. The processing of ray segments associated with different destination pixels can be computed in parallel without modifying shared resource and therefore without using semaphore mechanism.

As there are many destination pixels on a image screen, the ray tracing problem can fit well on a massively multi-threaded computing architecture. For a single destination pixel there may be multiple ray segments. As the contribution for multiple ray segments to a single pixel are accumulated, the final color can be determined as a weighted sum of each ray segment associated with the pixel. For example, when the ray segments to a single pixel are processed using different threads on a massively multi-threaded computing architecture, the update of a pixel's final color, which is a shared resource for the threads associated with the same pixel, requires the use of a semaphore mechanism. For example, a N:1 dependency mechanism described above can be used for ray tracing.

Using active and/or proactive semaphores, operations for tracing ray segments (including ray segments associated with a common pixel) can be executed in parallel. In one embodiment, the semaphore identifier can be determined by hashing the destination pixel address. If there are fewer semaphores available than independent pixels, some pixels may share a semaphore. This is a performance issue but not a functional problem. In this embodiment, the semaphores can be used dynamically without global synchronization. Without using semaphores, operations for tracing ray segments associated with a pixel are performed sequentially. Thus, use of semaphores with ray tracing techniques allows for greater parallel processing.

Figure 3:
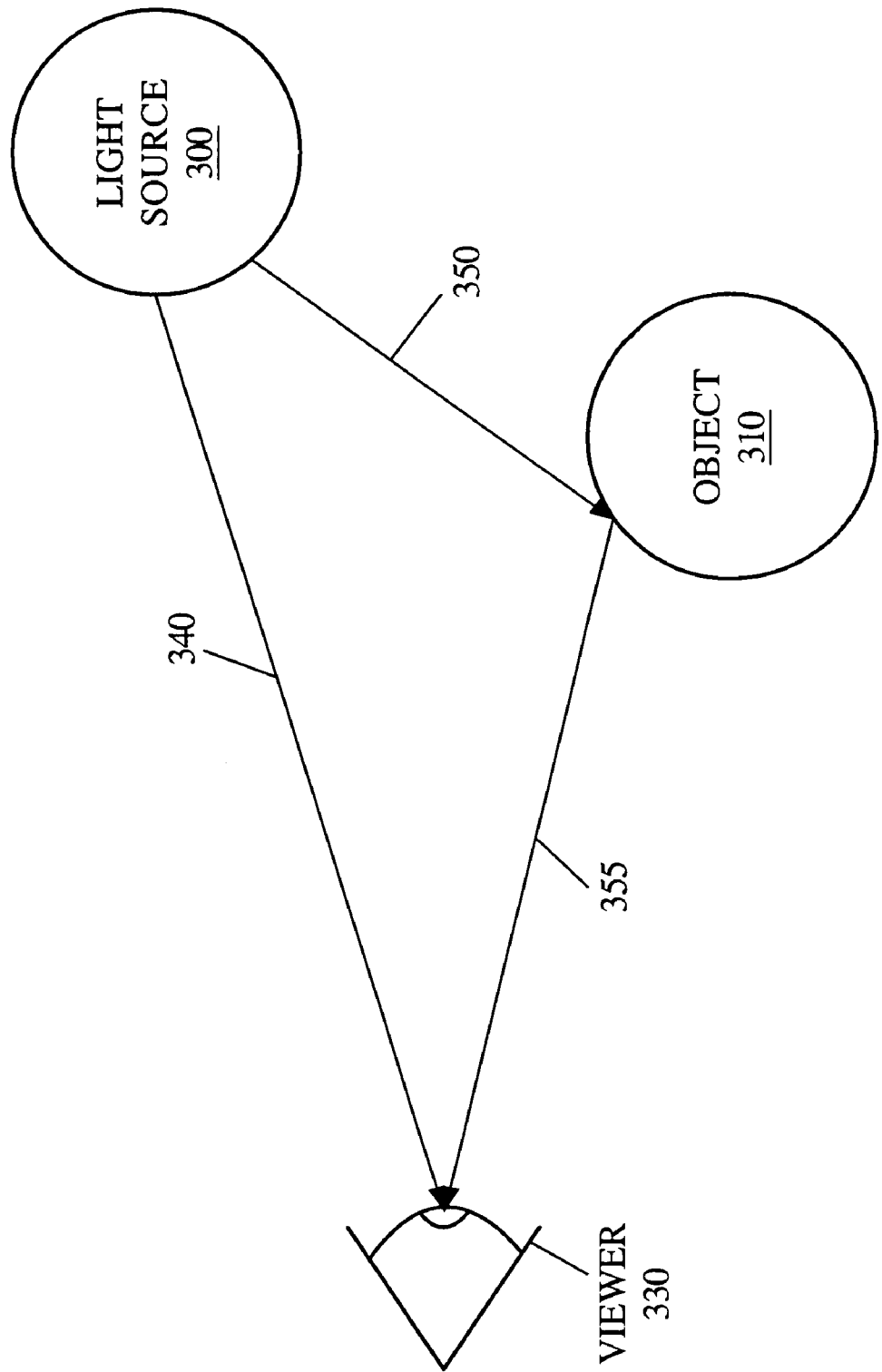
FIG. 3 is a simple example scene in which rays are traced from a light source to a viewer.

FIG. 3 is a simple example scene in which rays are traced from a light source to a viewer. A large number of rays travel between light source 300 and viewer 330; however, only a small number of rays are illustrated in FIG. 3 for reasons of simplicity of description.

Ray 340 travels directly from light source 300 to viewer 330. Because ray 340 is not reflected or refracted, the pixels corresponding to ray 340 are represented by the color of light provided by light source 300. Ray tracing computations for the light corresponding to ray segments 350 and 355 is more complex because the light is reflected by object 310.

As discussed above, ray tracing operations for segments 350 and 355 can be performed in parallel. Thus, ray tracing operations for segments 350 and 355 can be performed as two threads, the results of which are combined to provide the pixel color resulting from the multiple ray tracing operations. Coordination of the two threads can be accomplished using active semaphores as described above.

Figure 4:
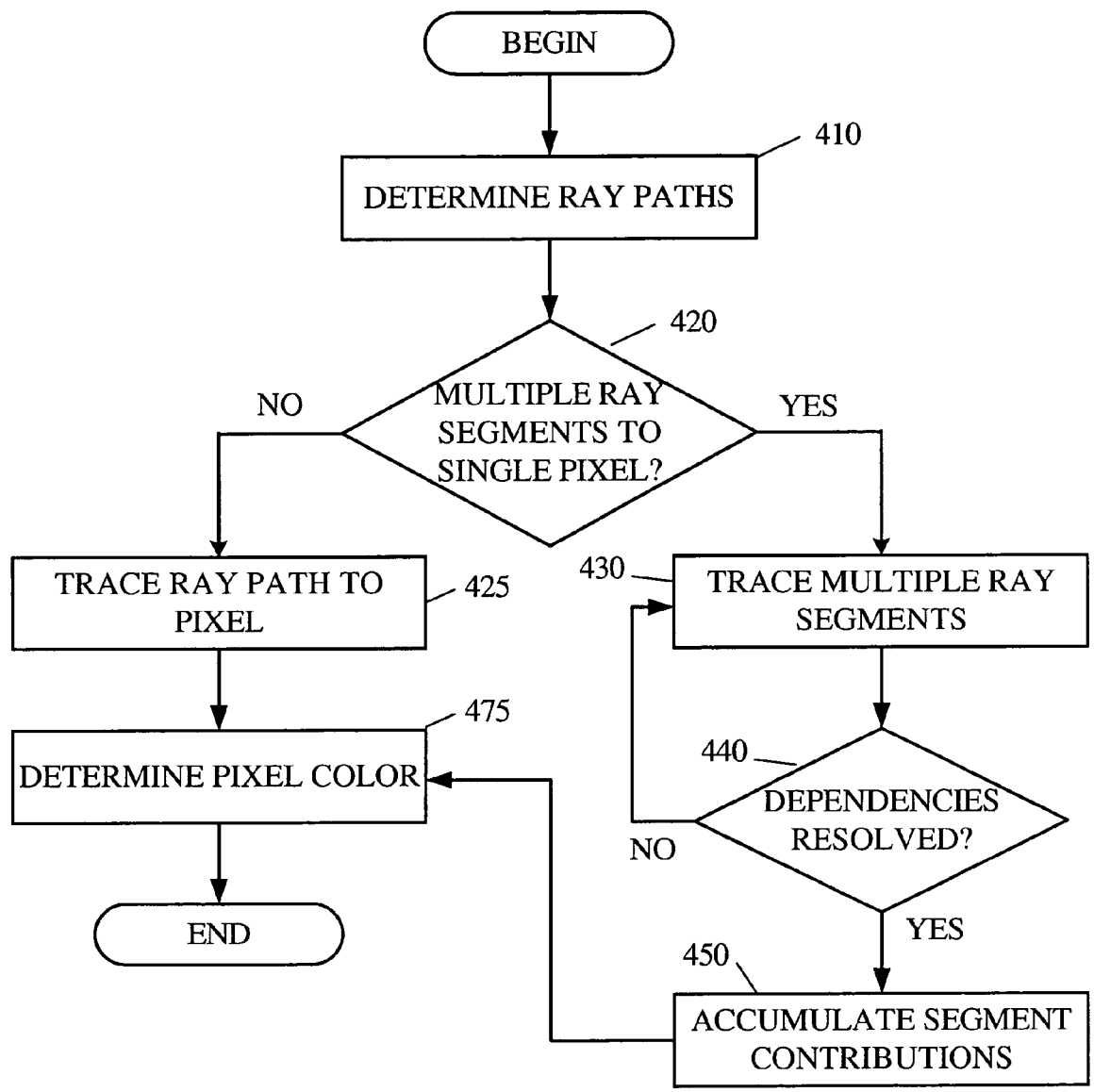
FIG. 4 is a flow diagram of one embodiment of ray tracing using active semaphores.

FIG. 4 is a flow diagram of one embodiment of ray tracing using active semaphores. The ray paths are determined, 410. Determination of ray paths can be accomplished in any manner known in the art. The components (e.g., hardware components, software components, etc.) used in the ray tracing operations determine whether multiple ray segments contribute to a single pixel, 420.

If a single ray segment contributes to a single pixel, 420, the ray path is traced, 425. For this single ray segment, any ray tracing technique known in the art can be used. A pixel color is determined, 475, based on the results of the ray tracing operations. The pixel can then be displayed, printed or otherwise rendered for viewing.

If multiple ray segments contribute to a single pixel, 420, one or more of the multiple ray segments can be traced in parallel. Ray tracing for multiple ray segments in parallel can create a N:1 dependency where the pixel result is dependent upon the results of the ray tracing operations for the N ray segments. This N:1 dependency is handled as described above.

When the dependencies are resolved, 440, the results of the multiple ray tracing operations are accumulated, 450. A pixel color is determined, 475, based on the results of the accumulated ray tracing operations. The pixel can then be displayed, printed or otherwise rendered for viewing.

Z-buffer-based Three-Dimensional Rendering Using Active Semaphores

In Z-buffer-based three-dimensional graphics rendering, rendered objects are divided into render primitives such as points, lines, triangles, triangle strips, etc. The render primitives are projected onto the viewing screen. Render primitives projected onto different screen pixels can be rendered independently. When multiple opaque primitives are projected onto the same screen pixel, only the primitive in front of other primitives (with a smaller distance measure from the destination pixel, the so called Z value) updates the screen pixel color.

The Z-buffer is a screen size buffer that, on a pixel-by-pixel basis, stores the Z value of the most recent update to screen pixels. Obscurities are resolved using Z-test. For any primitive that projects on a screen pixel, the primitive's Z-value is compared with the Z-value stored in the Z-buffer for screen pixel. If the primitive's Z-value is smaller than the Z-buffer value, the destination pixel color is updated with the rendered color from the primitive, and the Z-buffer value is updated as well. If the primitive's Z-value is equal to or greater than the Z-buffer value, the destination pixel color as well as the corresponding Z-buffer value is unchanged.

In order to produce consistent screen pictures, the primitives projected onto the same screen pixel must be rendered in the strict order. The Z-buffer-based three-dimensional rendering can be realized using multi-threaded processing on a massively threaded architecture. For example, independent primitives can be rendered by independent threads. Dependencies between the primitives, for example the Z-buffer test and update on a common pixel by multiple primitives, can be resolved using the semaphore mechanisms described above.

Figure 5:
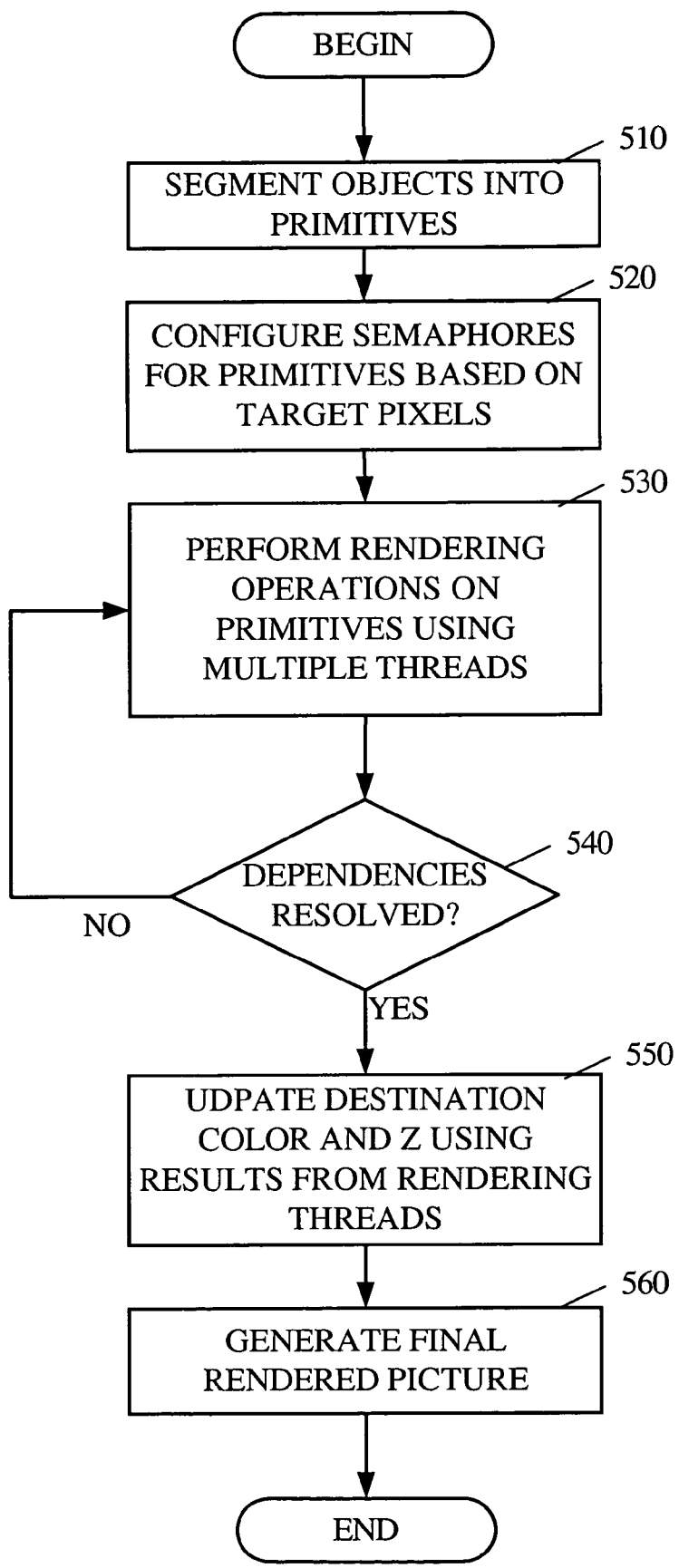
FIG. 5 is a flow diagram of one embodiment of Z-buffer-based three-dimensional graphics rendering using proactive ordered semaphores.

FIG. 5 is a flow diagram of one embodiment of Z-buffer-based three-dimensional graphics rendering using proactive ordered semaphores. The object(s) to be rendered are segmented into primitives and portions of primitives based on the projections to the viewing screen, 510. The semaphores are configured for the primitives or portions of primitives based on the projected screen pixel locations, 520.

Rendering operations are performed on the primitives or portions of primitives by multiple threads of instructions, 530. The threads can be executed by one or more processors and can resolve dependencies using one or more of the semaphore mechanisms described above. For example, three-dimensional rendering for multiple primitives by different threads that are projected onto the same screen pixel can create a 1:1:1 dependency where the Z-test and destination color update of each thread is dependent upon the results of one or many threads updating the same screen pixel preceding the thread. This 1:1:1 dependency is handled as described above.

When the dependencies are resolved, 540, the thread for the given primitive or primitive segment performs Z-test and upon successful Z-test updates the Z-value and color value for the projected pixel, 550. A final rendered picture is generated after the primitives are rendered, 560. The final rendered picture can then be displayed, printed or otherwise presented for viewing.

Video Decoding Using Active Semaphores

In some video coding standards, for example MPEG-2, groups of one or more segments (such as macroblocks) within a picture (visual object plane, or VOP) can be decoded by independent threads of instructions. In some video coding standards, for example MPEG-4, decoding of a picture segment such as a macroblock has dependency of decoding of other picture segments. Therefore, a picture can be decoded by multiple threads of instructions on a multi-threaded architecture. Dependencies between the threads can be resolved using the semaphore mechanisms described above.

MPEG-2 is described, for example, in ISO/IEC 13818 "Generic coding of moving pictures and associated audio information" published in October 2000 and related standards. MPEG-4 is described, for example, in ISO/IEC 14496 "Coding of audio-visual objects" published in March 2002 and related standards.

Figure 6:
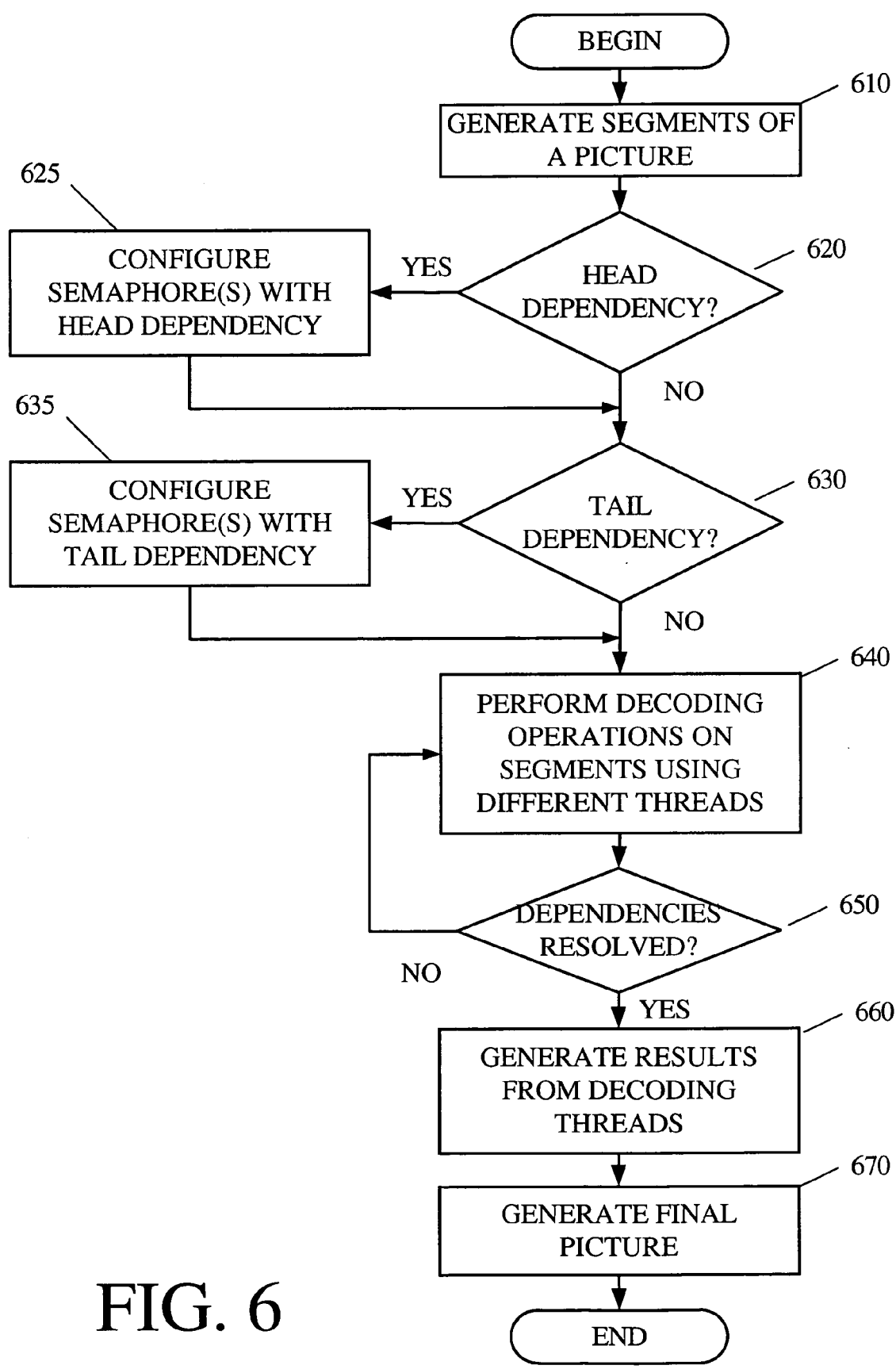
FIG. 6 is a flow diagram of one embodiment of video decoding using active and/or proactive semaphores.

FIG. 6 is a flow diagram of one embodiment of video decoding using active and/or proactive semaphores. The flow diagram depicts the decoding process of one picture of a video sequence. The same process can be repeated to decode multiple pictures of a video sequence. The segments of a picture to be decoded are determined, 610. The segments can be, for example, blocks, groups of blocks, macroblocks or groups of macroblocks, or any other segmentation of the frame to be decoded.

In one embodiment, before decoding operations are performed on the segments by different threads of instructions, 640, inter-segment dependencies are determined. If a segment has head dependency—decoding of the segment depends on the decoding results of other segments, 620, —one or more semaphores with head dependency are configured for the thread of instructions that processes the segment, 625. If a segment has tail dependency—decoding of the subsequent segment(s) depends on the decoding results of this segment, 630,—one or more semaphores with tail dependency are configured for the thread of instructions that processes the segment, 635.

Decoding operations are performed on the segments by multiple threads of instructions, 640. The threads can be executed by one or more processors and can resolve dependencies using one or more of the semaphore mechanisms described above. For example, for a segment that has head dependency on N segments, dependency of these segments can be resolved using a semaphores configured in N:1 dependency mode. The threads of the N dependent segments are configured with semaphores with tail dependencies and the one depending segment is configured with semaphore with a head dependency. This N:1 dependency is handled as described above.

When the dependencies of a segment are resolved, 630, the results of the decoded segment are generated, 650. A final picture is generated from the aggregated segment results, 660. The final decoded picture can then be displayed, printed or otherwise presented for viewing.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
    execution circuitry to receive and execute a first thread of instructions corresponding to a first graphical element of an image and a second thread of instructions corresponding to a second graphical element of the image, wherein the execution circuit transmits a semaphore request message and places the first thread in an inactive state in response to the first thread requiring a resource having an associated semaphore; and
    a semaphore entity coupled with the execution circuitry to receive the semaphore request message from the execution circuitry and to selectively grant control of the semaphore in response to the semaphore request message by transmitting a semaphore acknowledge message to the execution circuitry, wherein the execution circuitry, in response to receiving the semaphore acknowledge message, removes the thread of instructions from the inactive state.

2. The apparatus of claim 1 wherein the execution circuitry comprises:
    a first execution circuit to execute the first thread of instructions; and
    a second execution circuit to execute the second thread of instructions.

3. The apparatus of claim 1 wherein the first thread comprises a first set of ray tracing instructions and the first graphical element comprises a first ray segment, and further wherein the second thread comprises a second set of ray tracing instructions and the second graphical element comprises a second ray segment.

4. The apparatus of claim 1 wherein the first thread comprises a first set of video decoding instructions and the first graphical element comprises a first picture segment, and further wherein the second thread comprises a second set of video decoding instructions and the second graphical element comprises a second picture segment.

5. The apparatus of claim 4 wherein the first picture segment comprises a first macroblock and the second picture segment comprises a second macroblock.

6. The apparatus of claim 1 wherein the first thread comprises a first set of three-dimensional rendering instructions and the first graphical element comprises a first render primitive, and further wherein the second thread comprises a second set of three-dimensional rendering instructions and the second graphical element comprises a second render primitive.

7. The apparatus of claim 6 wherein the first render primitive comprises one of a first point, a first line, a first triangle, and a first triangle strip, and further wherein the second render primitive comprises one of a second point, a second line, a second triangle, and a second triangle strip.

8. The apparatus of claim 1 further comprising a memory coupled with the execution circuitry to store the first thread of instructions and the second thread of instructions.

9. The apparatus of claim 1 further comprising:
    at least one additional execution circuit to execute threads of instructions; and
    a thread dispatcher coupled with the execution circuitry and at least one additional execution circuit to dispatch threads for execution.

10. The apparatus of claim 1 wherein when the first thread of instructions is in the inactive state, execution of the instructions ceases and the execution circuitry does not poll the semaphore entity to determine a status of the semaphore request message.

11. A system comprising:

a memory controller;

execution circuitry coupled with the memory controller to receive and execute a first thread of instructions corresponding to a first graphical element of an image and a second thread of instructions corresponding to a second graphical element of the image, wherein the execution circuit transmits a semaphore request message and places the first thread in an inactive state in response to the first thread requiring a resource having an associated semaphore; and a semaphore entity coupled with the execution circuitry to receive the semaphore request message from the execution circuitry and to selectively grant control of the semaphore in response to the semaphore request message by transmitting a semaphore acknowledge message to the execution circuitry, wherein the execution circuitry, in response to receiving the semaphore acknowledge message, removes the thread of instructions from the inactive state.

12. The system of claim 11 wherein the execution circuitry comprises:

a first execution circuit to execute the first thread of instructions; and a second execution circuit to execute the second thread of instructions.

13. The system of claim 11 wherein the first thread comprises a first set of ray tracing instructions and the first graphical element comprises a first ray segment, and further wherein the second thread comprises a second set of ray tracing instructions and the second graphical element comprises a second ray segment.

14. The system of claim 11 wherein the first thread comprises a first set of video decoding instructions and the first graphical element comprises a first macroblock, and further wherein the second thread comprises a second set of video decoding instructions and the second graphical element comprises a second macroblock.

15. The system of claim 14 wherein the first picture segment comprises a first macroblock and the second picture segment comprises a second macroblock.

16. The system of claim 11 wherein the first thread comprises a first set of three-dimensional rendering instructions and the first graphical element comprises a first portion render primitive, and further wherein the second thread comprises a second set of three-dimensional rendering instructions and the second graphical element comprises a second render primitive.

17. The system of claim 16 wherein the first render primitive comprises one of a first point, a first line, a first triangle, and a first triangle strip, and further wherein the second render primitive comprises one of a second point, a second line, a second triangle, and a second triangle strip.

18. The system of claim 11 further comprising a memory coupled with the memory controller to store the first thread of instructions and the second thread of instructions.

19. The system of claim 11 wherein when the first thread of instructions is in the inactive state, execution of the instructions ceases and the execution circuitry does not poll the semaphore entity to determine a status of the semaphore request message.

\* \* \* \* \*